United States Patent [19]
Lo et al.

[11] Patent Number: 5,809,505
[45] Date of Patent: Sep. 15, 1998

[54] SYSTEM AND METHOD FOR RELATIONAL TO OBJECT MAPPING

[76] Inventors: Thomas Lo, 1225 River Rd. #15b, Edgewater, N.J. 07020; Frank Longo, 76 Lester Dr., Tappan, N.Y. 10983

[21] Appl. No.: 769,149

[22] Filed: Dec. 18, 1996

Related U.S. Application Data

[60] Provisional application No. 60/019,768 Jun. 14, 1996.

(Under 37 CFR 1.47)

[51] Int. Cl.$^6$ ..................................................... G06F 17/30
[52] U.S. Cl. ......................... 707/102; 707/103; 707/100
[58] Field of Search ................................... 395/601, 602, 395/603, 607, 608, 609, 610, 611, 612, 613, 614, 615, 616, 617, 621; 707/1–4, 7–10, 100–104, 200, 201, 205; 364/228, 229.5, 282.4, 283.4; 345/329, 335

[56] References Cited

U.S. PATENT DOCUMENTS

| | | | |
|---|---|---|---|
| 5,212,787 | 5/1993 | Baker et al. | 707/101 |
| 5,398,336 | 3/1995 | Tantry et al. | 707/103 |
| 5,548,756 | 8/1996 | Tantry et al. | 707/10 |
| 5,611,076 | 3/1997 | Durflinger et al. | 707/102 |
| 5,615,112 | 3/1997 | Sheng et al. | 707/104 |

OTHER PUBLICATIONS

PCT search report dated Oct. 30, 1997 in PCT/US97/09662.

*Primary Examiner*—Wayne Amsbury
*Assistant Examiner*—Ruay Lian Ho
*Attorney, Agent, or Firm*—George T. Marcou; Kilpatrick Stockton LLP

[57] ABSTRACT

A relational to object mapping system and method permit the transfer and translation of data between a database server having a relational database and an object-oriented apparatus. The object code, such as C++, is translated by a generator object into suitable relational database statements, such as structured query language (SQL). The SQL statement is passed to a query object which executes the statement. In executing the SQL statement, the query object accesses an environment object which supplies the query object with appropriate connection objects for establishing a link between the query object and the database server. The database server supplies the requested data from the relational database to the query object which then stores the data in a storage buffer. The object-oriented apparatus can then access the data from the storage buffer. The query object may activate a transaction object for processing the data before the data is accessed by the object-oriented apparatus.

15 Claims, 4 Drawing Sheets

SYSTEM AND METHOD FOR RELATIONAL TO OBJECT MAPPING

This application is a provisional application of 60/019,768 filed Jun. 14, 1996, now pending.

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or of the patent disclosure, as it appears in the Patent and Trademark Office patent file or records, but otherwise reserves all copyright rights whatsoever.

FIELD OF THE INVENTION

The invention generally relates to a system and method for relational to object mapping and, more particularly, to a system and method for mapping C++ objects with a SQL relational database.

BACKGROUND OF THE INVENTION

It has generally been difficult to allow a system based on object-oriented programming to gain access to data in a relational database. A typical relational database is characterized by a database table having a plurality of fields with each field having a unique structural relationship to one another. The manufacturer or programmer constructing the relational database provides unique syntax rules which a program must follow in order to gain access to the data in the database. A structured query language (SQL) is an example of a well-known language having syntax rules for querying relational databases. With object-oriented programming, in contrast, an object is a data structure having procedures attached to it wherein the data is operated upon by the procedure. In order for an apparatus based on object-oriented programming to gain access to a relational database, the objects must be formed in accordance with the structure of a database and the unique syntax rules for the database. Many object-oriented computer systems have been developed with C++, a well known object-oriented language. This requirement of forming objects in accordance with the syntax rules, however, is a rather difficult task and errors can easily occur. Furthermore, since the objects must be defined with respect to a particular database's structure and rules, all of the objects in an object-oriented apparatus must be redefined if the apparatus attempts to access a different database. An object-oriented apparatus therefore cannot easily access data in a database.

In response to this difficulty between object-oriented apparatuses and databases, several different methods have been developed for integrating database language statements into object-oriented programs. For instance, with regard to SQL and C++, these methods include specifying the SQL statements as a character string constant in C++ programs; using character string constants representing relational tuples in combination with C++ functions and/or operators which in turn generate SQL in C++ programs; using "stored procedures" that are predefined procedures stored on the database for invocation from clients; or a combination of the above methods. All these methods have disadvantages, such as inflexibility in terms of the variations of SQL that can be generated; risk of runtime errors originating from incorrectly specified SQL; no way of leveraging existing SQL statements to create new SQL statements; and high dependencies between the database schema and C++ code making both resistant to change.

A need therefore exists for a system or method which can integrate the syntax rules of a database with object-oriented programming which overcomes the disadvantages of the prior art.

SUMMARY OF THE INVENTION

The relational to object mapping system or method according to a preferred embodiment of the invention uses the concept of a view, similar to that used in relational databases today, to achieve a level of abstraction from the actual database schema and to provide a leveraging mechanism. These views combined with the system's C++ operators and functions allow a programmer to generate virtually any SQL statement allowed by the database server. Since these views employ symbols generated from a preprocessor and uses C++ operators to create SQL expressions, runtime errors resulting from incorrectly typed tuple names or SQL expressions are caught at compile time. A view can be specialized creating yet another view, thereby leveraging existing SQL code to create new code. The relational to object mapping system and method are designed to provide dynamic mapping between C++ objects and relational databases. The dynamic C++ object mapping to an existing database schema can be one to one, one to many, or many to many between schema relations and C++ objects.

The system and method provide C++ classes and corresponding C code functions that allow the creation of C++ objects for the purposes of managing the access to the SQL databases. The system and method, more specifically, provide the following classes: a database connection and environment class, a statement generator class, a query processing class, and a bulk copy class.

The database connection and environment class and module set allows the definition of a database server, database tables, a user identification and passwords, and an amount of data table connections to maintain in its pool of available connections.

The SQL statement generator class and module set allows the C++ source code and application program to generate correctly formatted SQL statements to be sent to the database server via one of the maintained database connections. This class and module set also allows for the creation of C++ object defined database views that may be used in SQL statement creation by providing C code constructs to reference the database elements.

The query processing and bulk copy class and module set-allows for C++ control of the processing of the generated SQL statements. These query and copy classes provide an abstraction layer that allows the C++ object code to interface with the connection modules and the generated SQL to manage the relational database access, retrieval, and updates. The query processing can also provide for database transaction management and transaction roll-back control.

DETAILED DESCRIPTION OF THE PREFERRED EMBODIMENT

Reference will now be made in detail to the preferred embodiment of the invention, an example of which is illustrated in the accompanying drawings. The invention, in general, is a system or method for permitting objects in object-oriented programming to interface with relational databases. More specifically, the invention is preferably directed to C++ object-oriented programming and SQL databases. The invention provides C++ class definitions to allow programming of SQL database access directly using C++ coding constructs and techniques.

Figure 1:
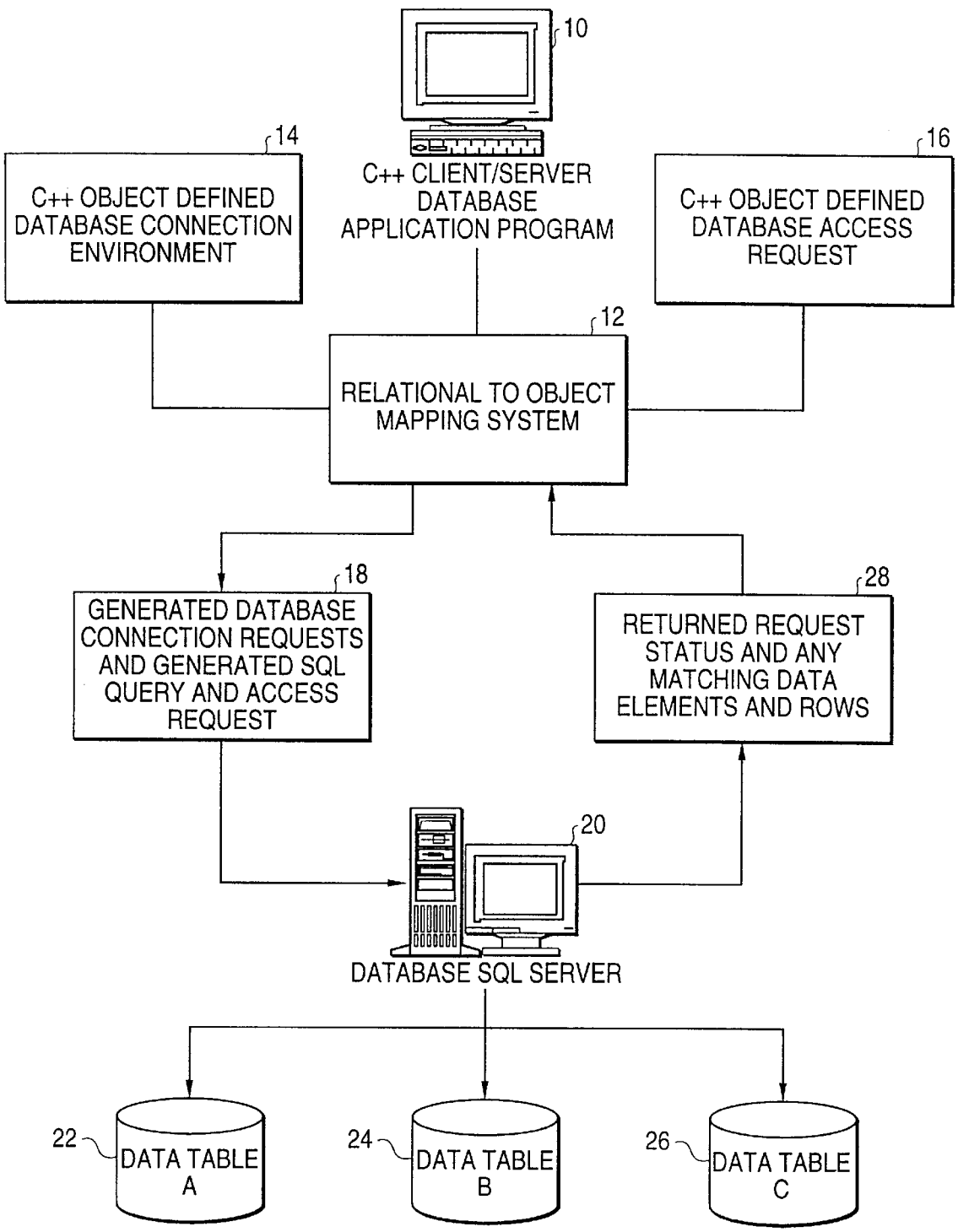
FIG. 1 is a diagram of a relational to object mapping system according to a preferred embodiment of the invention.

With reference to FIG. 1, a system according to a preferred embodiment of the invention includes a relational to object mapping system 12 for providing a programming interface. The relational to object mapping system 12 provides programming tools for allowing C++ object definitions 14 and 16 to transparently access and manage relational database tables located in storage devices 22, 24, and 26 through the system's 12 internally generated SQL statements and managed database and server connections 18. The system 12 provides a C++ applications developer with the elements needed to create an SQL server product independent SQL database applications. Further, with the system 12, C++ application development is enhanced with reusable and direct control of SQL database management access.

In the preferred embodiment, the system 12 provides definitions for the following C++ classes: an environment class, a database connection class, an SQL generator class, a query class, and a transaction class. While the system 12 preferably provides definitions for these classes, it should be understood that the system 12 may provide definitions for alternate or additional classes.

The environment class provides for the creation of database environment objects that manage the details of database connections. The environment objects which are defined will maintain a pool of database connection objects that are used to service the processing of query objects. The environment objects created with this class are defined with properties for an application name, user name, password, SQL server name, default database, and limits on the number of database connections to maintain in its pool of available connections. The environment class provides various methods for setting and accessing these properties and managing the size of the available connections pool. These various methods are the object's programming function calls used within the C++ application to code the processing with the objects: setdefaultServer(), setdefaultDbname(), setdefaultUser(), setdefaultPasswd(), setdefaultAppname(), theDefaultEnv(), getAppname(), getPasswd(), getUser(), getDbname(), getServer(), minConnections(), maxConnections(), minimizeConnections(), maximizeConnections(), getConn() and getBCPConn(). The values from these properties are used to initialize database connection objects that create connections to required database tables 22, 24, and 26. The use of the connections pool minimizes the delays associated with connecting to a required database 22, 24, or 26 and improves the performance of the system 12.

The database connection class provides for the creation of database connection objects that perform the actual communication and translation of requests to and replies from an SQL database 22, 24, or 26. Objects created with this class are usually created and managed by the environment and query objects, and are not normally used directly by an applications programmer unless more direct control of the connections is required.

The actual database connection may not be established at the object's creation time, but will be deferred until a time when needed. A connection may be forced to occur by using the connect() method of the object or may be pre-allocated into the environment pool by using the environment object's maximizeConnections() method. The getconnok() method returns a status that indicates if a connection to a data server 20 is active or is inactive.

The database connection objects also contain methods to send SQL commands to the SQL server 20, control the functions of the commands, and test the status of the following commands: cmd(), execute(), getcmdok(), getconnok(), cancel(), results-pending(), count(), getRefCount(), retStatus(), and reset(). The environment used for a connection object may be changed using the changeEnv() method.

Data from data tables 22, 24, and 26 is retrieved through the use of the get() method to interactively assign a data column element to a program data buffer or by using the bind() method to permanently attach a data column element to a program data buffer. Bulk copy data access is also possible using the methods bcpinit(), bcpbind(), bcpsend(), bcpflushbatch(), bcpcommit(), and isBCP().

The SQL generator class allows the creation of SQL expressions and defines database view objects that are provided as parameters to query objects for execution. The expressions and views generated through this class may be built upon to create new and different SQL constructs. The use of the generator objects provides C++ programming constructs and validations to the task of creating SQL statements within a C++ application. Functions within the generation objects parse the provided parameters and translate the code from the application into the SQL syntax that is required by the SQL data server 20 defined in the environment objects.

The query class allows the creation of query objects. Query objects are used to program the actual execution of generated SQL and the interaction for data retrieval and control. The query objects serve as the medium of communication to and from the SQL database server 20. A query object communicates to an environment object to obtain a connection object and then provides the functional methods to perform the SQL statements.

The query objects contain many of the same methods for use as the database connection objects and actually provide their functions by communicating the calls to the corresponding methods within the database connection objects. However, the query objects provide a much easier programming interface for the control of performing an actual query execution.

A submission of SQL to a query object is provided through the use of the double less-than operator (<<), which allows for character string data and C++ built-in types or defined expression/view objects to be used in creating the final SQL statement to be performed. The mixing of expression objects and C++ types for a single SQL sequence should be avoided due to possible unexpected results.

Query objects provide the following methods for execution, status and control: connect(), execute(), done(), flushcmd(), cancel(), rows_affected(), results-pending(), retStatus(), fail(), ok(), reset(), and changeEnvTo().

The relational to object mapping system 12 may retrieve data for an object-oriented application apparatus 10 through three different methods. First, the double greater-than operator (>>) is available for retrieving the current returned row's data column elements into program data buffers. When using this operator, the column elements must be retrieved into data buffers in the same order in which they were defined in the SQL statement. Second, the get() method is available to interactively retrieve any single column's data element into a program data buffer and has no order restrictions. Third, the bind() method is available to permanently attach a data column element to a program data buffer. The following additional methods are provided to format the returned data before it is stored into a program data buffer: setw() and width() to identify the length of a returned element, settruncblanks() to identify the truncation of trailing blanks from a returned element, and setnullterm() to identify that an element should be null character terminated.

A transaction class is provided as a derived class from the query class. The transaction class allows the creation of transaction objects that provide for database transaction processing. A use of a transaction object will give the application apparatus 10 the control to roll back, or not make, a database change using the rollback() method. In order to actually make a database change using the transaction objects, a commit() method must be performed.

If a transaction object were to be destroyed before having either of these two methods performed, an automatic rollback() will be issued.

Figure 2:
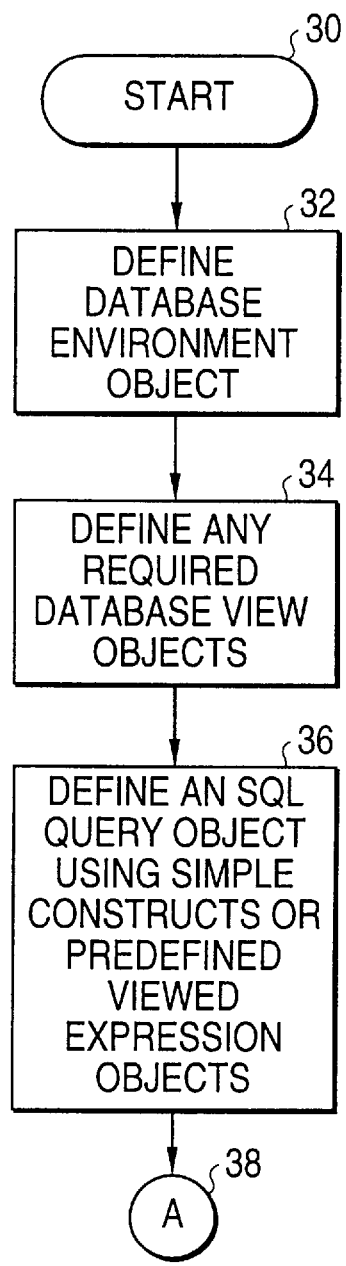
FIG. 2 is a flowchart illustrating a first portion of a method according to the preferred embodiment of integrating relational databases with objects.
Figure 3:
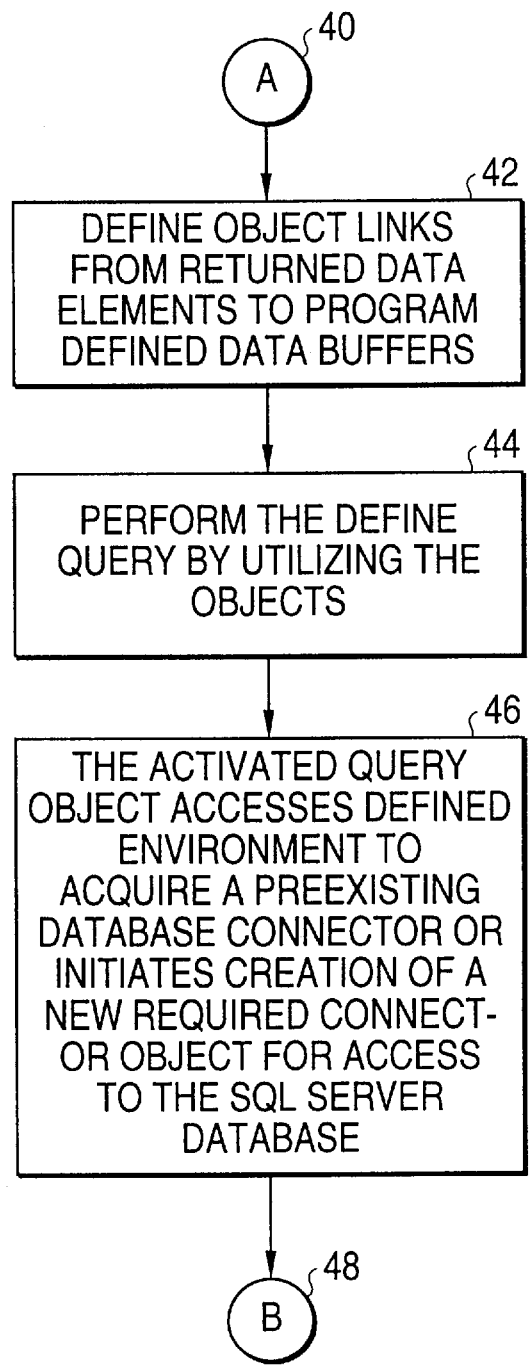
FIG. 3 is a flowchart illustrating a second portion of the method of integrating relational databases with objects.
Figure 4:
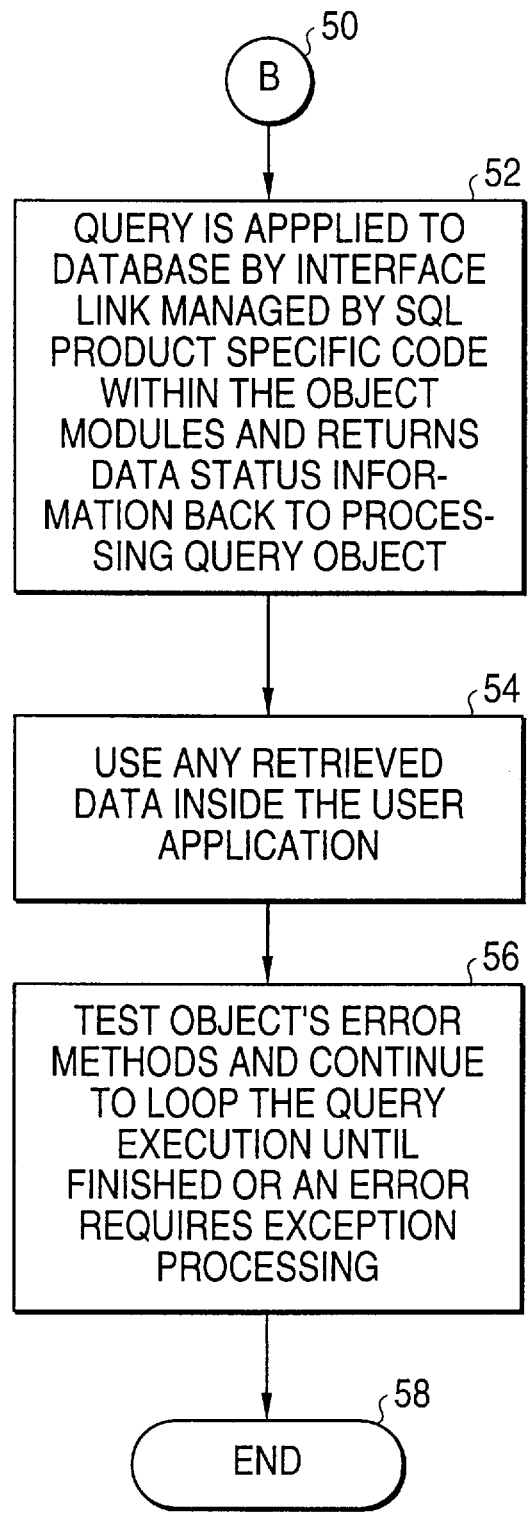
FIG. 4 is a flowchart illustrating a final portion of the method of integrating relational databases with objects.

A method for a relational to object mapping according to a preferred embodiment of the invention is shown in FIGS. 2 to 4. With reference to FIG. 2, SQL access from within a C++ application is initialized by generating a database environment object at step 32. This step includes defining an environment object with an application name, SQL server name, user name, required password, default database, and limits for the number of database connections to maintain and manage.

Next, at step 34, SQL expression objects and views may be generated for use in defining SQL statement with C++ constructs. These C++ constructs are created using the SQL generator class definitions.

At step 36, an SQL Query object is defined using the query class definition. With this SQL query object, an application programmer on the object-oriented application apparatus 10 can build an SQL query statement using simple SQL constructs supplied as character data or a combination of the previously defined expression/views objects. The construction of an SQL query may range from simple data retrievals to complex conditional database updates. The queries generated at step 36 may be virtually any SQL process allowed by the underlying SQL data server 20.

The application programmer at the apparatus 10 may now at step 42 define links that connect return values from the SQL query to data storage buffers that are defined inside of the application apparatus 10. The programmer may alternatively decide to use one of the other data access methods of the query object such as the get() method or the double greater-than operator (>>) to interactively retrieve data column elements from the query results.

Next, at step 44, the query object with a defined SQL statement is executed. The query object may be executed by generating a sequential programming loop developed using the done() object method or in a batch style. If interactive processing of the query results is not a requirement, then the query object may be executed using the execute() method of the query object.

At step 46, the activated query object will access the defined environment object 46 to acquire a preexisting database connection object from the environment's pool. Alternatively, the query object may initiate the creation of a new required connection object for access to the SQL server database in storage devices 22, 24, and 26.

With reference to FIG. 4, at step 52, the query is applied to the database by the interface link that is managed by the SQL product specific code contained within the object modules. This product specific code is the abstraction layer that has been isolated from the application programmer and can be substituted with different versions to provide a link to completely different underlying SQL database servers without a need for redesign or reprogramming. This processing of the query object returns database data and processing status information back into the application programming through the object's communication methods.

Next, at step 54, the program can now extract any retrieved data column elements into its data buffers and use this data within the designed features of the application. During the processing of the query object, the error and status methods need to be tested at step 56 and the system should continue to process the query in a loop until its data access has finished or until an error condition requires exception processing.

It should be recognized that the system and method disclosed are merely illustrative of the principles of the present invention. Numerous modifications and adaptations thereof will be readily apparent to those skilled in the art without departing from the spirit and scope of the present invention. Accordingly, the invention is only limited by the following claims.

We claim:

1. A method for mapping an object-oriented apparatus to a relational database, comprising the steps of:

producing at least one connection object for establishing communications with a database server which interfaces with said relational database;

generating an environment object for managing said at least one connection object;

linking a query object with a database query statement having a defined environment object;

producing a generator object generating said database query statement for said object-oriented apparatus; and forming an interface link between said query object and a storage medium, said interface link transferring said database query statement to said database server and returning said relational data to said storage medium, said storage medium being accessible by said object-oriented apparatus.

2. The method as set forth in claim 1, further comprising the steps of:

executing said query object to cause said query object to access said environment object, and to acquire said connection object, said query object passing said database query statement over said interface link to said database server; and receiving relational data from said database server and storing said relational data in said storage medium defined by said interface link.

3. The method as set forth in claim 2, further comprising the steps of:

testing error and status messages; and revising at least one of said connection object, said environment object, said query object, or said interface link upon one of said error or status messages; and repeating said executing, testing, and revising steps until none of said error or status messages is received.

4. The method as set forth in claim 1, further comprising a step of translating object-oriented code into database syntax with expression objects.

5. The method as set forth in claim 4, wherein said step of linking said query object comprises a step of building said database query statement from said expression objects.

6. The method as set forth in claim 1, wherein said object comprises a C++ object and said database query statement comprises an SQL statement.

7. The method as set forth in claim 1, further comprising a step of providing a transaction object for processing said relational data received from said database server.

8. A system for mapping an object-oriented apparatus to a relational database, comprising:
   at least one connection object for establishing communications with a database server having said relational database;
   an environment object for managing said at least one connection object;
   a query object for executing a database query statement and for communicating with said environment object to acquire said connection object;
   a generator object for generating said database query statement on behalf of said object-oriented apparatus and for providing said database query statement to said query object; and
   an interface link between said query object and a storage medium, said interface link transferring said database query statement to said database server and returning said relational data to said storage medium, said storage medium being accessible by said object-oriented apparatus.

9. The system as set forth in claim 8, further comprising a transaction object for processing said relational data received from said database server.

10. The system as set forth in claim 8, wherein said database query statement comprises an SQL statement and said object-oriented apparatus is programmed with C++.

11. A method for interfacing between a database server having a relational database and an object-oriented apparatus, comprising the steps of:
   translating code from said object-oriented apparatus into a database query statement for said database server;
   transferring said database query statement to a query object and retrieving at least one connection object through an environment object;
   passing said database query statement from said query object to said database server through an interface link defined by said connection object; and
   receiving over said interface link data from said relational database and storing said data in a storage medium defined by said connection object, said storage medium being accessible by said object-oriented apparatus.

12. The method as set forth in claim 11, further comprising a step of processing said data received from said database server.

13. A system for transferring data between a relational database and an object-oriented apparatus, comprising:
   at least one connection object;
   an environment object for managing said at least one connection object;
   a generator object for translating code from said object-oriented apparatus into a database query statement for said database server;
   a query object for receiving said database query statement from said generator object and for retrieving the at least one connection object through said environment object, said query object establishing a connection to said database server over an interface link defined via said connection object;
   said query object receiving said data in said relational database from said database server over said interface link and storing said data in a storage medium specified by said interface link, said storage medium being accessible by said object-oriented apparatus.

14. The system as set forth in claim 13, further comprising a transaction object for processing said data received by said query object from said database server.

15. The system as set forth in claim 13, wherein said generator object translates C++ code into SQL statements.

* * * * *